INVENTORS
Leonhard Katz
Samuel Schweitzer
by Roberts, Cushman & Grover
ATT'YS

June 1, 1965 L. KATZ ETAL 3,187,087

HEAT RADIATOR AND ELECTRIC CONNECTION APPARATUS FOR RECTIFIERS AND THE LIKE

Filed July 17, 1961 2 Sheets-Sheet 2

3,187,087
HEAT RADIATOR AND ELECTRIC CONNECTION APPARATUS FOR RECTIFIERS AND THE LIKE

Leonhard Katz, Woburn, and Samuel Schweitzer, Cambridge, Mass., assignors to Astro Dynamics, Inc., Burlington, Mass., a corporation of Massachusetts Filed July 17, 1961, Ser. No. 124,715
3 Claims. (Cl. 174—70)

This invention relates to rectifier bridge assemblies and more particularly to a means for incorporating into such an assembly a plurality of suitably interconnected heat radiators.

Increasingly, semi-conductor electronic components are being utilized in high power applications. Chief among these applications is the conversion of alternating current to direct current. Semi-conductor elements, such as silicon rectifiers, are particularly suited for this purpose because of their low forward voltage drop and their consequentially low power dissipation. These characteristics give rise to very high efficiency of operation as compared to any previously available rectifying means. Further, these semi-conductor elements are of relatively low cost as compared to earlier systems.

One problem, however, that exists with the use of semi-conductor elements is that they are extremely sensitive to heat so that, despite the great efficiency obtainable, certain provisions must be made to quickly dissipate that heat which is produced.

Accordingly, a prime object of the present invention is to provide a rectifier bridge assembly, adapted to utilize semi-conductor rectifying elements, which incorporates effective heat radiating means.

Further objects are to provide such an assembly which is of exceptionally compact and simple arrangement, which requires a minimum of different parts, which is sturdy and rigid, which is easily assembled, which is relatively inexpensive and whose mechanical arrangement facilitates electrical connection to semi-conductor elements.

The invention contemplates, in a specific illustrative embodiment, a rectifier bridge assembly involving: a plurality of heat radiators each of which includes a plurality of spaced parallel plates joined by a transverse thermal bus bar, a plurality of mounting apertures passing through each of said plates, and a plurality of fins extending from at least one face of each of said plates, the arrangement of each radiator being such that all sections parallel to a given plane are substantially similar; a plurality of electrical bus elements each of which has at least two holes corresponding to the mounting apertures in a single one of said plates, and a flat electrical connection surface the plane of which extends through the axes of said holes; and mounting rod means adapted to pass through corresponding apertures and holes in said radiators and said bus elements respectively, whereby adjacent pairs of radiators may be electrically connected by a pair of said bus elements, the respective electrical connection surfaces of each being in contact.

For purposes of illustration a preferred embodiment of the invention is shown in the accompanying drawings in which.

Figure 2:
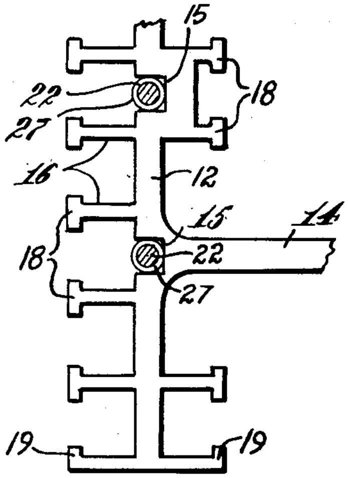
FIG. 2 is a fragmentary plan view of a detail of the assembly.

Referring now to the drawings, six heat radiators 10 are arranged for use with a full wave electrical bridge circuit for converting three-phase alternating current to direct current. These radiators are of a type disclosed in my co-pending application for Letters Patent Serial No. 129,316, filed August 4, 1961, and entitled Heat Radiator, now Patent No. 3,147,802. As taught by that disclosure, each radiator involves, in an H-shaped configuration, a pair of substantially flat plates 12 joined by a thermal bus bar 14. Extending from each side of each plate are a plurality of fins 16 each of which is terminated by a transverse flange 18 or 19. Near the center of each plate 12 are a pair of mounting apertures or grooves 15 (FIGURE 2) by which the radiator may be mounted as set forth below. All sections of the radiator taken transverse the length of the fins 16 are essentially similar so that the radiator may be manufactured largely by extrusion, as for example of aluminum.

Figure 4:
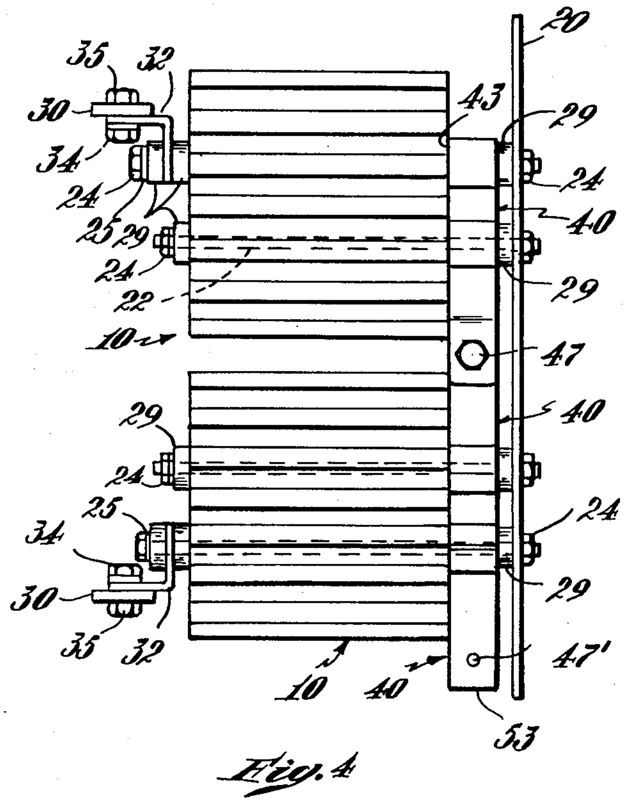
FIG. 4 is an end view of the assembly.

The radiators 10 are attached in a 2 x 3 array to a mounting board 20 by threaded rods 22 and by nuts and washers 24 and 25 respectively (FIGURE 4). The rods, nuts, and washers, however, are not in direct contact with the metal radiators 10 but rather are electrically insulated therefrom by a sleeve 27 (FIGURE 2) which may, for example, be constructed of Teflon and by insulating washers 29 (FIGURE 4). The sleeves 27 extend as completely as possible from one nut to the other on each rod 22.

Figure 3:
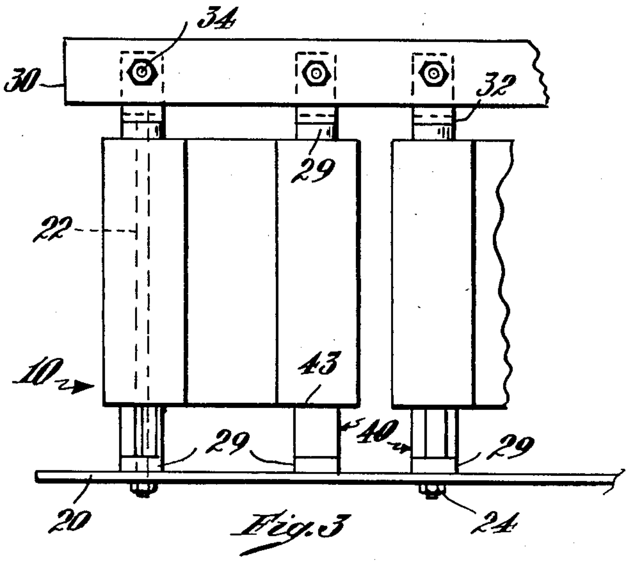
FIG. 3 is a fragmentary elevation view of the assembly.

Above each row of radiators 10 is mounted an electrical bus bar 30. These bus bars are mounted on the radiators by means of brackets 32 which are also assembled on the threaded rods 22, the bus bars 30 being attached to the brackets by nuts and bolt 34 and 35 respectively. The arrangement of these parts in relation to the various insulating washers 29 may be seen in FIG. 3.

Figure 1:
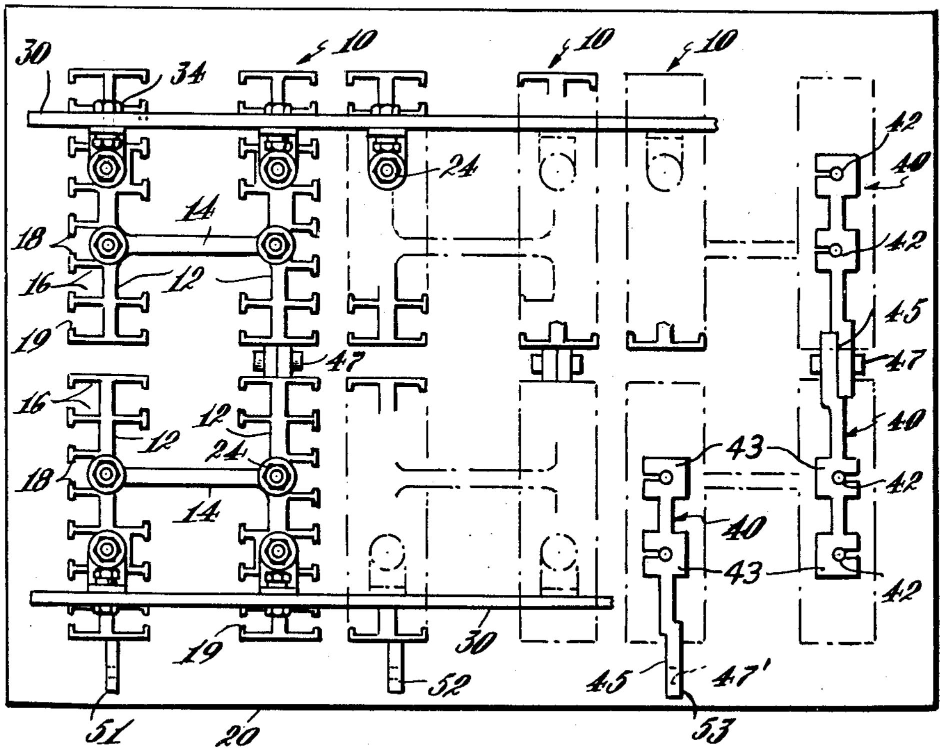
FIG. 1 is a top, plan view of a rectifier bridge assembly, some parts being broken away.

Between the radiators 10 and the mounting board 20 are arranged electrical bus elements 40 by which certain of the radiators 10 may be electrically interconnected and also connected to an external circuit. These elements 40 are also electrically insulated from the rods 22 by the sleeves 27 but have flat surfaces 43 in direct electrically conductive contact with the respective radiators 10. These bus elements are elongate bars having a pair of parallel mounting holes 42 which are spaced by the same distance as the mounting grooves 15 in the radiators 10 and having also a flat electrical connection surface 45 the plane of which extends through the axes of the mounting holes 42. A bolt hole 47' extends through the bar at this connection surface. As may be seen from FIG. 1, these bus elements 40 permit adjacent pairs of heat radiators to be electrically connected together, the respective connection surfaces 45 being drawn into effective engagement by bolts 47. Likewise, one row of heat radiators 10 is provided with bus elements 40 arranged so that the connection surfaces 45 project outwardly thereby constituting terminals 51, 52 and 53 by which respective pairs of heat radiators may be electrically connected to the three terminals of an external three-phase circuit.

In operation, semi-conductor rectifying elements are mounted on each of the thermal bus bars 14, appropriate apertures being provided. Typically these rectifying elements are provided with one electrical side of the circuit element connected to the case of the rectifier so that the physical mounting thereof on the radiator 10 also creates an effective electrical connection between that side of the electrical element and the radiator. Another connection to the electrical element is typically brought out by means of a heavy cable which may be connected to the insulated electrical bus bar 30. By a suitable well known arrangement of these rectifying elements on the various radiators, a full wave rectifying bridge is formed in which the terminals 51, 52 and 53 are the three-phase current inputs and the two electrical bus bars 30 provide the direct current output.

As pointed out in my previously cited co-pending application each of the heat radiators 10 provides very efficient heat dissipation from the associated rectifying elements and likewise this assembly by virtue of its novel interconnection and relation of its various parts, provides a very efficient and compact, complete current rectifying installation.

It should be understood that this disclosure is for the purpose of illustration only and that the invention includes all modifications and equivalents falling within the scope of the appended claims.

We claim:

1. A rectifier bridge assembly comprising: a plurality of heat radiators each of which includes a plurality of spaced parallel plates joined by a transverse thermal bus bar, a plurality of mounting apertures passing through each of said plates, and a plurality of fins extending from at least one face of each of said plates, the arrangement of each radiator being such that all sections parallel to a given plane are substantially similar; a plurality of electrical bus elements each of which has at least two holes corresponding to the mounting apertures in a single one of said plates, and a flat electrical connection surface the plane of which extends through the axes of said holes; and mounting rod means adapted to pass through corresponding apertures and holes in said radiators and said bus elements respectively, whereby adjacent pairs of radiators can be electrically connected by a pair of said bus elements, the respective electrical connection surfaces of each element being in contact with that of the other.

2. A rectifier bridge assembly comprising: a plurality of heat radiators each of which includes as part of an integral structure a pair of spaced parallel plates joined by a transverse thermal bus bar, a pair of mounting apertures passing through each plate and a plurality of fins extending from at least one face of each of said plates, the arrangement of each radiator being such that all sections parallel to a given plane are substantially similar; a mounting frame; a plurality of mounting rods for passing through said mounting apertures thereby to attach said radiators to said frame; sleeve means for insulating each of said rods from the corresponding radiator; spacing means for insulating said radiators from said frame; and a plurality of electrical bus elements each of which has a pair of holes corresponding to the mounting apertures in a single plate and a flat electrical connection surface the plane of which extends through the axes of said holes, whereby said radiators can be stacked in aligned rows and adjacent pairs of radiators can be electrically connected together by a pair of similar bus elements, said bus elements contacting at said electrical connection surfaces.

3. An assembly according to claim 2 and further comprising a plurality of bus bars, bracket means by which said bars may be mechanically connected to said radiators using said mounting rods, said bars being so connected on the opposite side of said radiators from said frame, and insulating means for electrically isolating said bars from said radiators and from said mounting rod means in cooperation with said sleeve means.

References Cited by the Examiner

UNITED STATES PATENTS

| | | | |
|---|---|---|---|
| 2,310,444 | 2/43 | Kriebel | 317—234 |
| 2,388,532 | 11/45 | De Lange et al. | 317—234 |
| 2,416,152 | 2/47 | Braun | 317—234 |

JOHN F. BURNS, *Primary Examiner.*

JOHN P. WILDMAN, LARAMIE E. ASKIN, *Examiners.*